United States Patent
Supik et al.

(10) Patent No.: US 10,297,912 B2
(45) Date of Patent: May 21, 2019

(54) COMPOSITE SHEET METAL COMPONENT AND BODY PANEL

(71) Applicants: Hyundai Motor Europe Technical Center GmbH, Russelsheim (DE); HYUNDAI MOTOR COMPANY, Seoul (KR); KIA MOTORS CORPORATION, Seoul (KR)

(72) Inventors: Vladimir Supik, Rüsselsheim (DE); Carsten Hoefer, Kelsterbach (DE); Volker Prescher, Kahl (DE); Michael Schreiber, Frankfurt am Main (DE); George Bedenian, Bensheim (DE); Stefan Lessmann, Frankfurt am Main (DE); Judith Hirsch, Riedstadt-Wolfskehlen (DE); Manfredo Agresti, Bergheim (DE); Pawel Kwasniak, Wiesbaden (DE)

(73) Assignees: Hyundai Motor Europe Technical Center GmbH, Russelsheim (DE); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 141 days.

(21) Appl. No.: 15/251,426

(22) Filed: Aug. 30, 2016

(65) Prior Publication Data

US 2017/0346172 A1 Nov. 30, 2017

(30) Foreign Application Priority Data

May 31, 2016 (DE) .................. 10 2016 209 414

(51) Int. Cl.
*H01Q 1/32* (2006.01)
*H01Q 1/40* (2006.01)
(Continued)

(52) U.S. Cl.
CPC .......... *H01Q 1/3283* (2013.01); *B60J 5/0484* (2013.01); *B60Q 1/0017* (2013.01);
(Continued)

(58) Field of Classification Search
CPC ........ H01Q 1/32; H01Q 1/325; H01Q 1/3283; H01Q 1/40
See application file for complete search history.

(56) References Cited

U.S. PATENT DOCUMENTS 5,177,494 A * 1/1993 Dorrie ............... H01Q 1/3283
343/711
6,522,241 B1 * 2/2003 Baudard ............... B60R 25/04
307/10.1

(Continued)

FOREIGN PATENT DOCUMENTS

DE 19621148 A1 12/1997
DE 102012106206 A1 1/2014
(Continued)

*Primary Examiner* — Hoang V Nguyen
(74) *Attorney, Agent, or Firm* — Morgan Lewis & Bockius LLP

(57) ABSTRACT

A composite sheet metal component for an automobile comprises an inner metal sheet, an outer metal sheet and an intermediate polymer sheet arranged between the inner and the outer metal sheet. The intermediate polymer sheet comprises a semiconductor device and the outer metal sheet comprises at least one functional area.

18 Claims, 11 Drawing Sheets

(51) Int. Cl.
*B60J 5/04* (2006.01)
*B60Q 1/00* (2006.01)
*F21S 9/02* (2006.01)
*H01H 13/02* (2006.01)
*H01H 13/14* (2006.01)
*H01H 13/52* (2006.01)
*H01H 9/16* (2006.01)
*H01H 9/54* (2006.01)

(52) U.S. Cl.
CPC ............... *F21S 9/02* (2013.01); *H01H 9/16* (2013.01); *H01H 9/547* (2013.01); *H01H 13/023* (2013.01); *H01H 13/14* (2013.01); *H01H 13/52* (2013.01); *H01Q 1/40* (2013.01); *H01H 2231/026* (2013.01)

(56) References Cited

U.S. PATENT DOCUMENTS

| | | | |
|---|---|---|---|
| 6,621,178 B2 * | 9/2003 | Morillon | B60R 25/245 307/10.1 |
| 2009/0226755 A1 | 9/2009 | Sigler et al. | |
| 2014/0232016 A1 * | 8/2014 | Ohno | H01L 25/18 257/777 |
| 2015/0145646 A1 * | 5/2015 | Seino | G07C 9/00309 340/5.61 |

FOREIGN PATENT DOCUMENTS

| | | |
|---|---|---|
| KR | 2003-0078371 A | 10/2003 |
| KR | 10-1331796 B1 | 11/2013 |

* cited by examiner

COMPOSITE SHEET METAL COMPONENT AND BODY PANEL

CROSS-REFERENCE TO RELATED APPLICATION

This application is based on and claims the benefit of priority to German Patent Application No. 102016209414.9, filed on May 31, 2016, in the German Intellectual Property Office, the disclosure of which is incorporated herein in its entirety by reference.

TECHNICAL FIELD

The present disclosure relates to a composite sheet metal component and a body panel comprising the composite sheet metal component.

BACKGROUND

Currently, the automotive industry has been making tremendous efforts to provide multifunctional parts as well as to reduce the number of assembly parts.

In conventional vehicles, composite sheet metal components used as body panels for car bodies, for example, car doors or tailgates, are generally configured as lightweight parts primarily to protect vehicle occupants. Typically, the conventional composite sheet metal components do not provide an integrated function, such as a switch, within the composite sheet metal components.

Consequently, there is a need to integrate further functional components within the composite sheet metal components such that a reduction of numbers of components in a vehicle can be inter alia realized.

Therefore, there exists a need to provide a composite sheet metal component that has inter alia a supporting, protecting as well as a functional property and is easily fully integrated as a body panel of a car. The composite sheet metal component for the body panel can be manufactured with conventional manufacturing processes for composite sheet metal components.

SUMMARY

The object of the present disclosure is to provide a composite sheet metal component that has inter alia a supporting, protecting as well as a functional property and is easily fully integrated as a body panel of a car.

According to an embodiment in the present disclosure, a composite sheet metal component for a vehicle comprises an inner metal sheet, an outer metal sheet and an intermediate polymer sheet arranged between the inner and the outer metal sheet. The intermediate polymer sheet comprises a semiconductor device and the outer metal sheet comprises at least one functional area.

According to another embodiment in the present disclosure, a body panel for an automotive comprising a composite sheet metal component having an inner metal sheet, an outer metal sheet and an intermediate polymer sheet arranged between the inner and the outer metal sheet.

An aspect of the present disclosure provides the composite sheet metal component with the semiconductor device integrated within the intermediate polymer sheet without adapting a conventional method for manufacturing the composite sheet metal component. This is possible due to the fact that semiconductor device can be printed within the intermediate polymer sheet. Further, a height of the semiconductor device does not exceed the thickness of the intermediate polymer sheet. In other words, the composite sheet metal component (also indicated as advanced functional sandwich) is presented, wherein the semiconductor device is integrated such that to conventional dimension of the inner metal sheet. The outer metal sheet and the intermediate polymer sheet are essentially not adapted to a size of the semiconductor device.

The composite sheet metal component according to the present disclosure has inter alia the advantages that by integration a functional device within the composite sheet metal component a number of components in the vehicle can be reduced. By such integration, more available package space can be provided in the interior of the vehicle.

Therefore, a reduction of components leads to a weight reduction which results in an improvement of fuel consumption. A reduction of drag coefficient by removing parts, that have a negative effect on the aerodynamic (for example door handles replaced by the semiconductor device arranged within the intermediate polymer sheet of the here described composite sheet metal component) of the vehicle. In fluid dynamics, the drag coefficient (commonly denoted as: cd, cx or cw) is a dimensionless quantity that is used to quantify the drag or resistance of an object in a fluid environment, such as air or water. In addition, by integrating the semiconductor device within the composite sheet metal component, new design geometry with respect to the car body or body panel can be realized which can result in a very environmental friendly car body geometry or shape.

Consequently, by reducing the parts for manufacturing the vehicle, the vehicle can be produced in a very cost-saving manner.

According to a further embodiment, the semiconductor device is the microelectronic device, for example a switch, sensor such as touch sensor and/or an optoelectronic device. In this context it should be understood that the semiconductor device integrated within the intermediate polymer sheet can be any kind of micromechanically, micro-electronical or printed device. The optoelectronic device can be for example a LED (Light Emitting Diode). The semiconductor device can also be printed within or on the intermediate polymer sheet, accordingly. The intermediate polymer sheet is not flush with a corresponding interface between the at least one functional area of the outer metal sheet and the intermediate polymer sheet.

Consequently, the integration of the semiconductor device within the intermediate polymer sheet can be realized by using a conventional manufacturing method for manufacturing the composite sheet metal component since the semiconductor device can preferably have dimensions smaller than a thickness of the intermediate polymer sheet.

The semiconductor device further comprises a passive tag antenna and is charged by radio energy waves transmitted by a source. Thus, a wiring of the semiconductor device within the intermediate polymer sheet can be realized cost-saving easily.

The at least one functional area of the outer metal sheet is located at least partially above the semiconductor device. The semiconductor device comprises a first electrode and a second electrode, wherein the second electrode is fixed on the semiconductor device and the at least one functional area is bendable toward the semiconductor device such that the first electrode is movable toward the second electrode. That is to say that by moving the first electrode toward the second electrode an electric circuit of the semiconductor device can be closed such that a function like opening the car door can be conducted.

The at least one functional area of the outer metal sheet is configured to transmit light generated by the semiconductor device. The at least one functional area of the outer metal sheet can for example be free of a material of the outer metal sheet. The material-free area, i.e. free of the material of the outer metal sheet, of the outer metal sheet can inter alia comprise a light transmitting material or a translucent material, accordingly.

The at least one functional area of the outer metal sheet comprises translucent or non-translucent areas. The translucent areas can comprise a light-transmitting material for example a polymer. Then non-translucent areas can comprise the same material as the outer metal sheet or a different material such as a non-translucent material. Thus, different lighting segments based on the at least one functional area of the outer metal sheet can be easily created on the composite sheet metal component.

The intermediate polymer sheet comprises a thermoplastic material with a thickness of 0.15 millimeter to 0.35 millimeter. By using such a thickness the semiconductor device can be easily integrated within the intermediate polymer sheet without modifying the conventionally used method for manufacturing the composite sheet metal component without the here described semiconductor device.

The thermoplastic material is PMMA (Poly(methyl methacrylate)). This material can be easily modified such that it is translucent or non-translucent. In addition, PMMA is resistant against UV-light and visible light such that it does not become yellow.

The intermediate polymer sheet comprises translucent and/or non-translucent materials configured to guide the light of the semiconductor device toward the at least one functional area of the outer metal sheet. That is to say that the semiconductor device is at least partially or completely not located under the at least one functional area of the outer metal sheet, wherein the translucent material of the intermediate polymer sheet functions as a light guide wherein on the interface to the non-translucent material the light generated in the semiconductor device can be at least partially reflected.

The translucent material comprises microstructure elements such as prisms configured to couple out light of the semiconductor device via the at least one functional area of the outer metal sheet. Thus, the semiconductor device or the optoelectronic device can be additionally protected by the outer metal sheet and the light generated in the optoelectronic device is guided in the direction to the at least one functional area of the outer metal sheet such that the light is coupled out of the at least one functional area of the outer metal sheet. The microstructure elements can be arranged on a bottom side of the intermediate polymer sheet.

The inner metal layer and/or the outer metal sheet comprises aluminum, steel, magnesium or an alloy thereof with a thickness of 0.2 millimeter to 1.5 millimeter. Any combination of these materials may be adapted to the here described composite sheet metal component. For example to simultaneously increase the light weight ratio also a combination of aluminum and steel for the outer metal sheet, steel and magnesium or aluminum and magnesium are feasible. The outer metal sheet can comprise a metal or alloy which is different of the metal of alloy of the inner metal sheet.

The intermediate polymer layer is at least partially glued with the inner metal layer and the outer metal layer. For example, conventional glue is used. So the integration of the semiconductor device within the intermediate polymer layer can be easily realized. Furthermore is the integration cost-saving.

BRIEF DESCRIPTION OF THE DRAWINGS

Unless indicated otherwise, like reference numbers through the figures indicate like elements.

DETAILED DESCRIPTION OF THE EMBODIMENTS

Figure 1A:
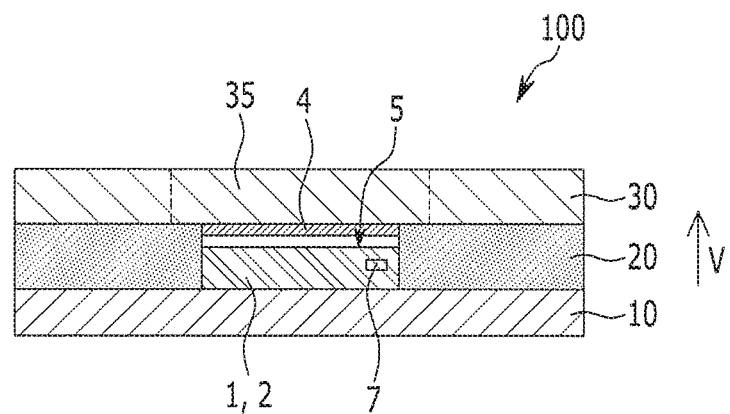
FIG. 1A is a schematic cross-sectional view of a composite sheet metal component according to an embodiment in the disclosure.

FIG. 1A is a schematic cross-sectional view of a composite sheet metal component according to an embodiment in the present disclosure.

FIG. 1A illustrates a composite sheet metal component 100 which can be used to build an automotive body, for example. The composite sheet metal component 100 comprises an inner metal sheet 10, an outer metal sheet 30 and an intermediate polymer sheet 20 which is arranged between the inner and the outer metal sheet 10, 30. The intermediate polymer sheet 20 comprises a semiconductor device 1, 2, 3 and the outer metal sheet 30 comprises at least one functional area 35. For example, the semiconductor device 1, 2, 3 shown in FIG. 1A can be a micro-electronic device, for example a switch. The switch can be configured to open a car door. In other words the composite sheet metal component 100 of FIG. 1A allows eliminating a door handle which has to be implemented to the car door in an elaborated process.

The composite sheet metal component 100 of FIG. 1A further comprises a first electrode 4 and a second electrode 5. The at least one functional area 35 of the outer metal sheet 30 is located at least partially above the semiconductor device 1, 2 comprising the first electrode 4 and the second electrode 5, wherein the second electrode 5 is fixed on the semiconductor device 1, 2 and the at least one functional area 35 is bendable toward the semiconductor device 1, 2 such that the first electrode 4 is movable toward the second electrode 5. As a result inter alia an electronic circuit of the semiconductor device 1, 2 becomes closed and executes a function, for example opening the car door.

The semiconductor device 1, 2 of FIG. 1A comprises a passive tag antenna 7 and is charged by radio energy waves transmitted by a source. The source can be an electromagnetic source generating radio energy waves.

The semiconductor device of FIG. 1A and also in the here described further embodiments of the composite sheet metal component 100 is integrated within the intermediate polymer sheet 20 such that a thickness in vertical direction W of the semiconductor device 1, 2, 3 is less than the thickness of the intermediate polymer sheet 20. For instance, the semiconductor device 1, 2, 3 can be printed within a cavity in the intermediate polymer sheet 20. Further, the semiconductor device 1, 2, 3 can be a stand-alone device which is integrated within, for example, a cavity in the intermediate polymer sheet 20.

Figure 1B:
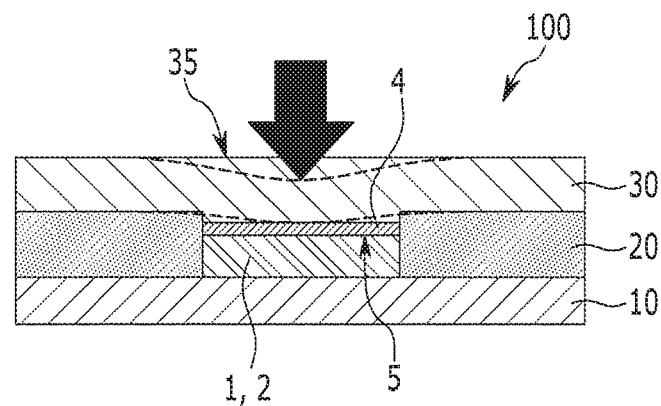
FIG. 1B is another schematic cross-sectional view of the composite sheet metal component of FIG. 1A.

FIG. 1B is a further schematic cross-sectional view of the composite sheet metal component of FIG. 1A.

FIG. 1B illustrates the composite sheet metal component 100 of FIG. 1A with the difference that the at least one functional area 35 is already bended toward the semiconductor device 1, 2 such that the first electrode 4 is in contact with the second electrode 5.

Figure 2A:
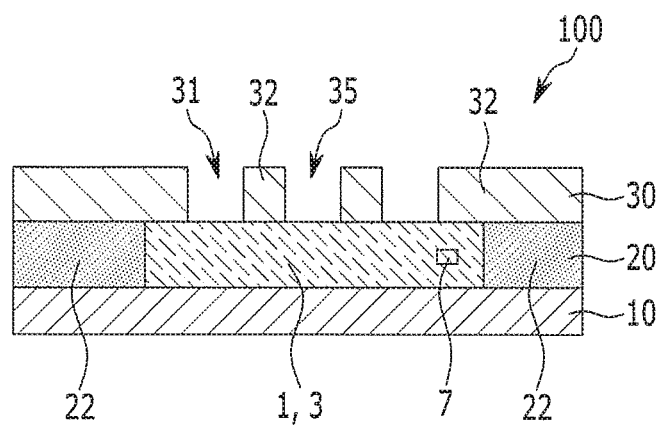
FIG. 2A is a schematic cross-sectional view of a composite sheet metal component according to an embodiment in the present disclosure.

FIG. 2A is a schematic cross-sectional view of a composite sheet metal component according to an embodiment in the present disclosure.

FIG. 2A illustrates a further embodiment in the present disclosure wherein the semiconductor device 1, 2, 3 comprises an optoelectronic device 3, for example, a LED. The LED or the semiconductor device or the optoelectronic device 3 comprises the passive tag antenna 7 and are charged by radio energy waves transmitted by the source.

The composite sheet metal component 100 of FIG. 2A comprises the outer metal sheet 30 with the at least one functional area 35. The at least one functional area 35 of the outer metal sheet 30 is configured to transmit light generated by the optoelectronic device 3 or any light generating apparatus which fulfills the here described dimensional criteria. For example, the at least one functional area 35 is formed as a grid with areas 31 free of the material of the outer metal sheet 30 and areas 31 comprising the material of the outer metal sheet 30. For example, the areas 31 free of the material of the outer metal sheet 30 can comprise a translucent material. Alternatively, the at least one functional area 35 can comprise a grid, wherein the grid comprises translucent or non-translucent areas 31, 32 within the at least one functional area 35 of the outer metal sheet 30.

Figure 2B:
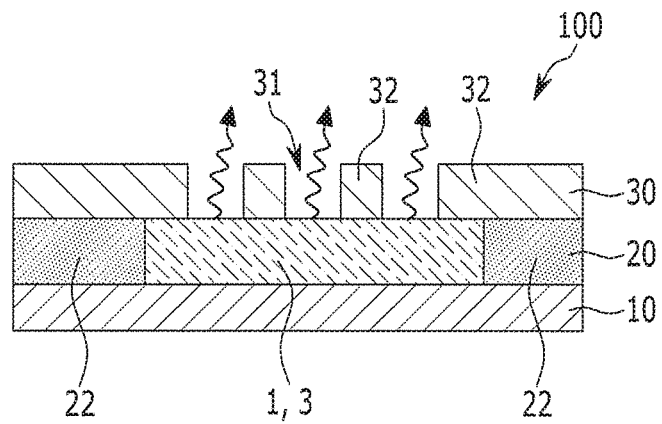
FIG. 2B is a schematic cross-sectional view of a further embodiment of FIG. 2a according to an embodiment in the present disclosure.

FIG. 2B is a schematic cross-sectional view of a further embodiment of FIG. 2A according to an embodiment in the present disclosure.

FIG. 2B is based on FIG. 2A, wherein light generated in the optoelectronic device 3 or semiconductor device 1, 3 transmit the light though an opening within the at least one functional area 35 or alternatively the translucent and translucent areas 31, 32.

Figure 2C:
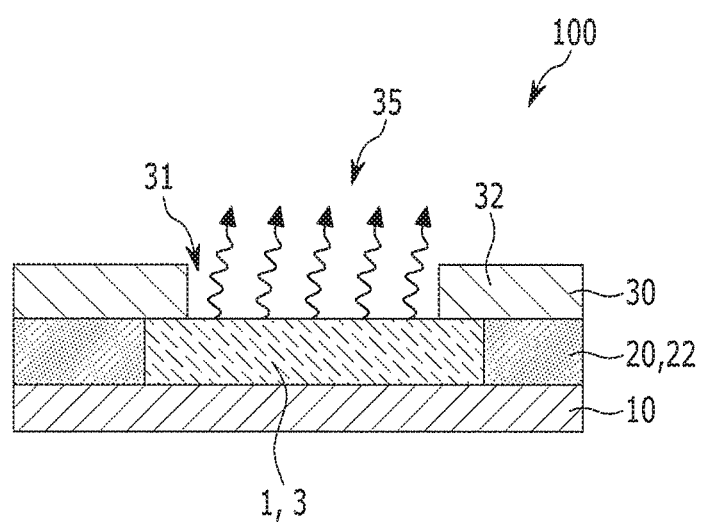
FIG. 2C is a further schematic cross-sectional view according to a further embodiment in the present disclosure.

FIG. 2C is a further schematic cross-sectional view according to a further embodiment in the present disclosure.

FIG. 2C is based on the FIGS. 2A and 2B with the difference that the at least one functional area 35 can be free of any material and comprises an opening through which the generated light in the semiconductor device or optoelectronic device 1, 3 can be coupled out or transmitted in case the opening comprises the translucent material.

Figure 3A:
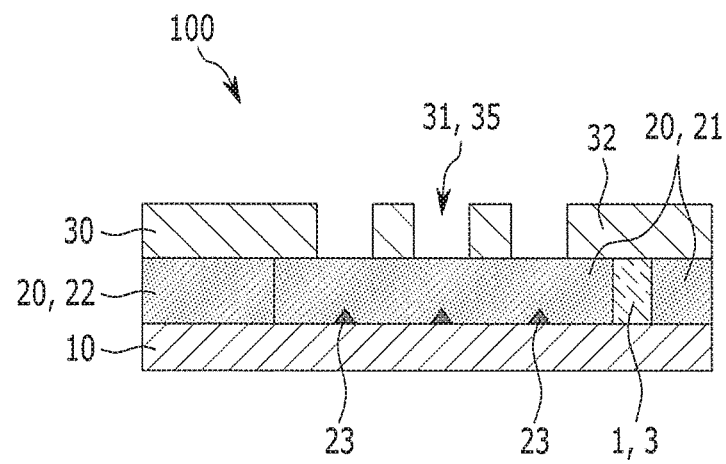
FIG. 3A is a schematic cross-sectional view according to an embodiment in the present disclosure.

FIG. 3A is a schematic cross-sectional view according to an embodiment in the present disclosure.

FIG. 3A shows a further embodiment of this invention, wherein the composite sheet metal component 100 of FIG. 3A comprises the semiconductor device 1, 3 or optoelectronic device 3 which is located within or is integrated within the intermediate polymer sheet 20 in a section of the intermediate polymer sheet 20 which does not overlap with the at least one functional area 35 of the outer metal sheet 30. The intermediate polymer sheet 20 comprises translucent 21 and/or non-translucent materials 22 configured to guide the light of the semiconductor device 1, 3 toward the at least one functional area 35 of the outer metal sheet 30.

The intermediate polymer sheet 20 comprising the translucent material 21 is located at least partially under the at least functional area 35 such that the generated light can couple out via the at least one functional area 35. To increase or improve the lighting efficiency on an opposite side to the semiconductor device the intermediate polymer sheet 30 comprises the non-translucent materials such that the generated light can be reflected on the non-translucent material 22.

Further, a mirror can be arranged at the interface between the translucent and non-translucent material 21, 22. That is to say, that the intermediate polymer sheet 20 of FIG. 3A functions at least partially as the light guide and the area comprising the non-translucent material 22 can act as reflector. The translucent material 21 comprises microstructure elements 23 configured to couple out light of the semiconductor device 1, 3 via the at least one functional area 35 of the outer metal sheet 30.

Figure 3B:
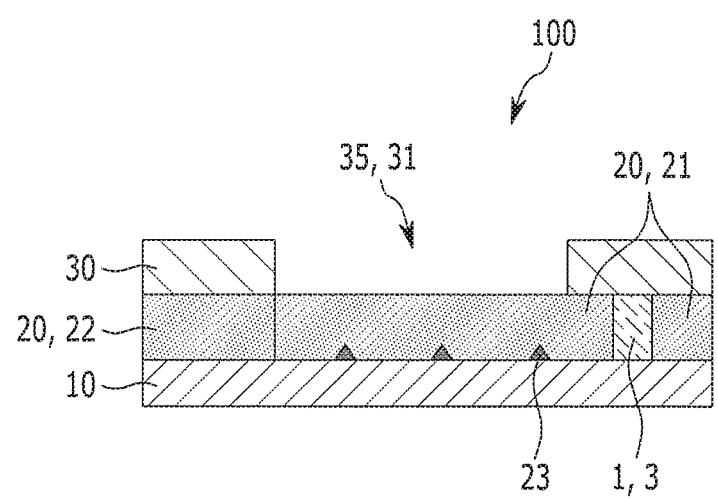
FIG. 3B is a schematic cross-sectional view according to an embodiment in the present disclosure.

FIG. 3B is a schematic cross-sectional view according to an embodiment in the present disclosure.

FIG. 3B is based on FIG. 3A with the difference that the at least one functional area 35 is completely free of the material of the outer metal sheet 30 or the corresponding opening comprises the translucent material.

Figure 4:
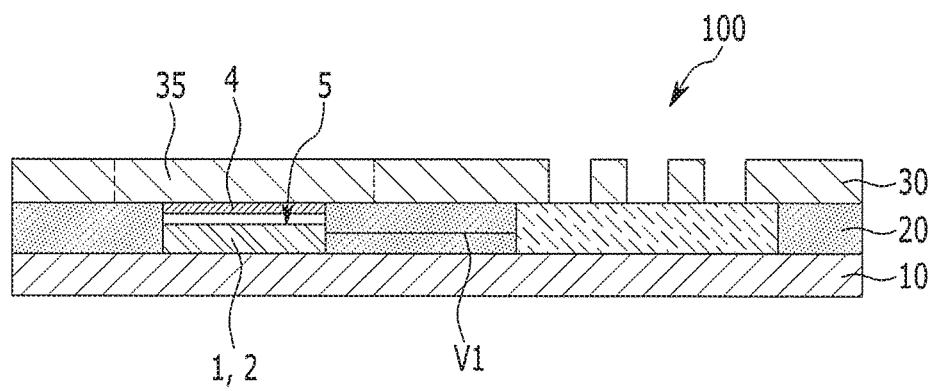
FIG. 4 is a schematic cross-sectional view of a composite sheet metal component according to an embodiment in the present disclosure.

FIG. 4 is a schematic cross-sectional view of a composite sheet metal component according to an embodiment in the present disclosure.

FIG. 4 illustrates the composite sheet metal component 100 wherein the semiconductor device 1, 2, 3 are connected via a connection line V1 configured to connect the microelectronic device 2 with the optoelectronic device 3 such they can interact with each other. For example, by bending the at least one functional area 35 as shown in FIG. 1B the optoelectronic device 3 can be switched on.

Figure 5:
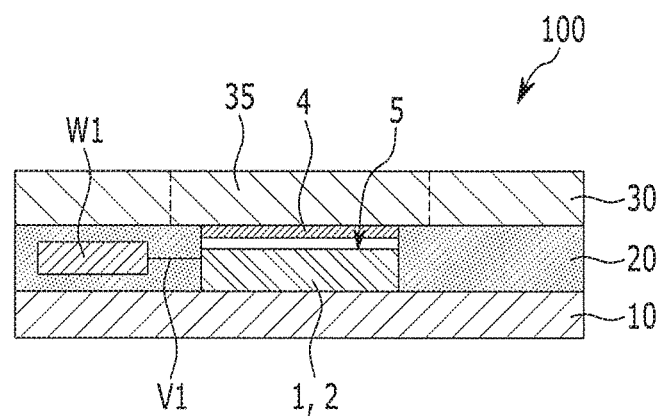
FIG. 5 is a schematic sectional view of the composite sheet metal component according to any embodiment in the present disclosure.

FIG. 5 is a schematic sectional view of the composite sheet metal component according to any embodiment in the present disclosure.

The composite sheet metal component 100 of FIG. 5 shows inter alia the intermediate polymer sheet 20 comprising a wiring W1 and the semiconductor device 1, 2, 3 which is integrated in the intermediate polymer sheet 20. Alternatively, the semiconductor device 1, 2, 3 is a stand-alone device which functions without any wiring W1 within the composite sheet metal component 100. The wiring W1 can be connected via the connection V1 wherein the wiring W1 can be located within the intermediate polymer sheet 20 or at an interface between the intermediate polymer sheet 20 and the inner metal sheet 10 or the outer metal sheet 30. The wiring can be printed on the intermediate polymer sheet 20.

FIGS. 6A-6D are schematic cross-sectional views of the composite sheet metal component according to various embodiments in the present disclosure.

Figure 6A:
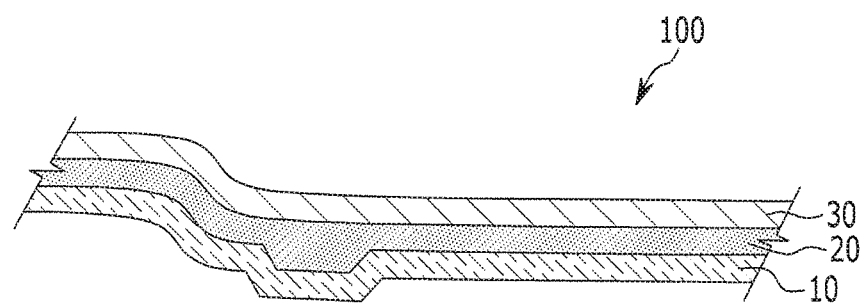
FIGS. 6A-6D are schematic cross-sectional views of the composite sheet metal component according to various embodiments in the present disclosure.
Figure 6B:
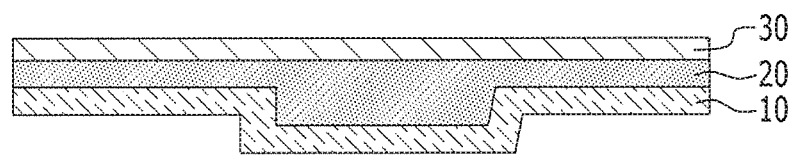
Figure 6C:
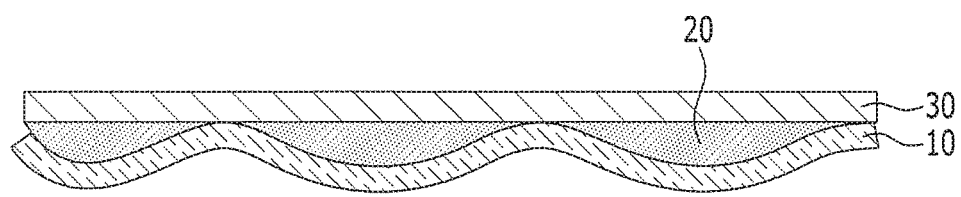
Figure 6D:
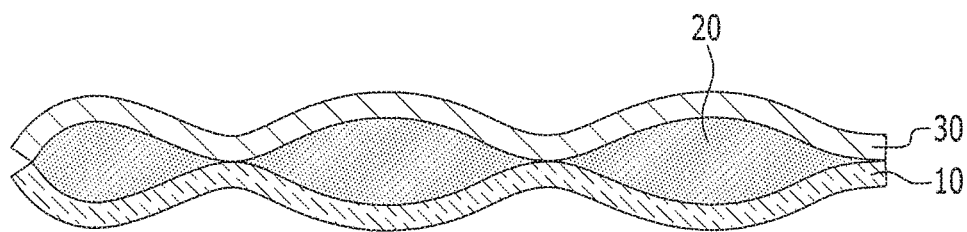

FIGS. 6A-6D show different shapes of the here described composite sheet metal component 100 (the semiconductor device is not shown). It is clear from the context that the here described composite sheet metal component can not only be only plane. It can be bent as shown in FIG. 6A or embossed as shown in FIG. 6A, 6B, 6C or 6D. For example, various geometrical shapes with respect to the here described composite sheet metal component 100, wherein the semiconductor device 1, 2, 3 can be integrated in the intermediate polymer sheet 20 such that the thickness of the intermediate polymer sheet 20 is configured to integrate, implement, and/or arrange the semiconductor device 1, 2, 3.

FIGS. 7A-7D are schematic cross-sectional views of body panels 50 according to various embodiments in the present disclosure.

Figure 7A:
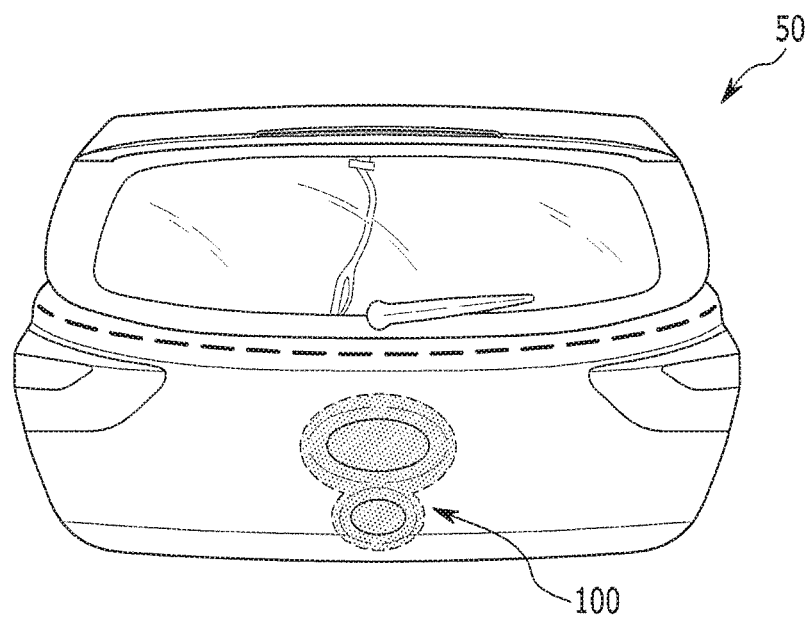
FIGS. 7A-7D are schematic cross-sectional views of body panels according to various embodiments in the present disclosure.

FIG. 7A shows a tailgate of the automotive, wherein the composite sheet metal component 100 can be based on the composite sheet metal component 100 as shown in FIG. 4.

Figure 7B:
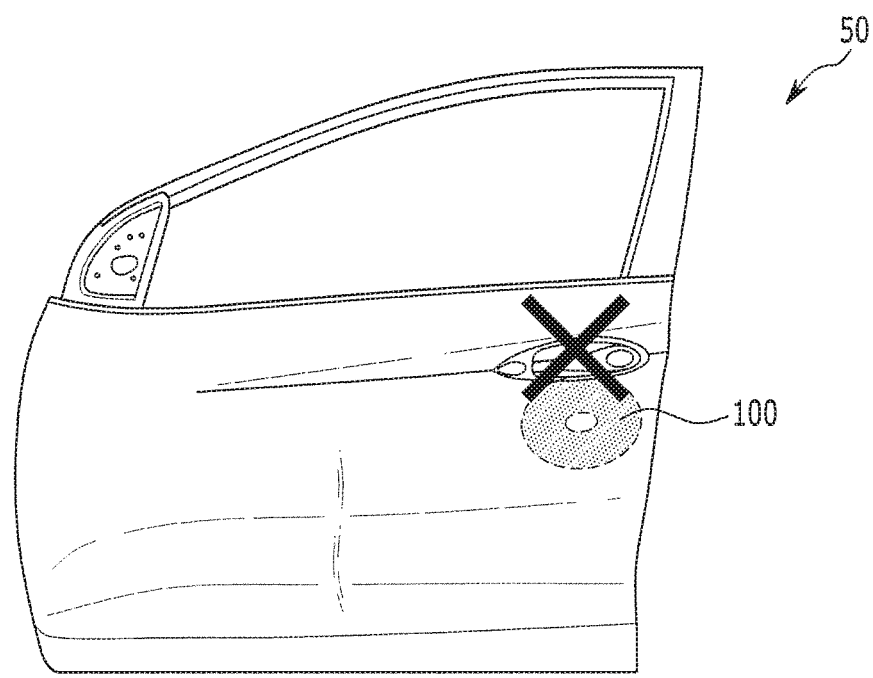

FIG. 7B shows a car door, which can comprise the composite sheet metal component 100 as shown in FIGS. 1A and 1B, accordingly. Consequently, the door handle can be eliminated and the car door can be opened by bending the outer metal sheet 30 and activating the semiconductor device 1, 2 of the composite sheet metal component 100.

Figure 7C:
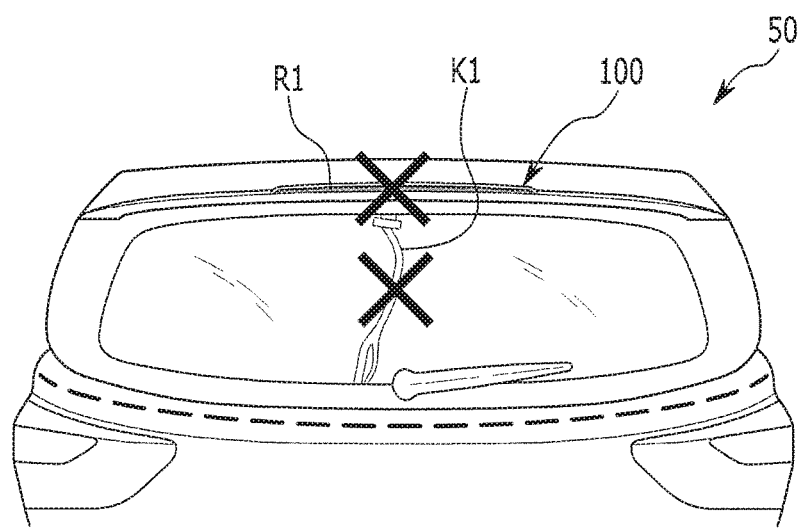

FIG. 7C shows a roof top comprising a rear light R1 and a wiring K1. The composite sheet metal component 100 as shown in FIGS. 1A-1C or 3A and 3B can now be replaced such that the rear light R1 and the wiring K1 can eliminated correspondently.

Figure 7D:
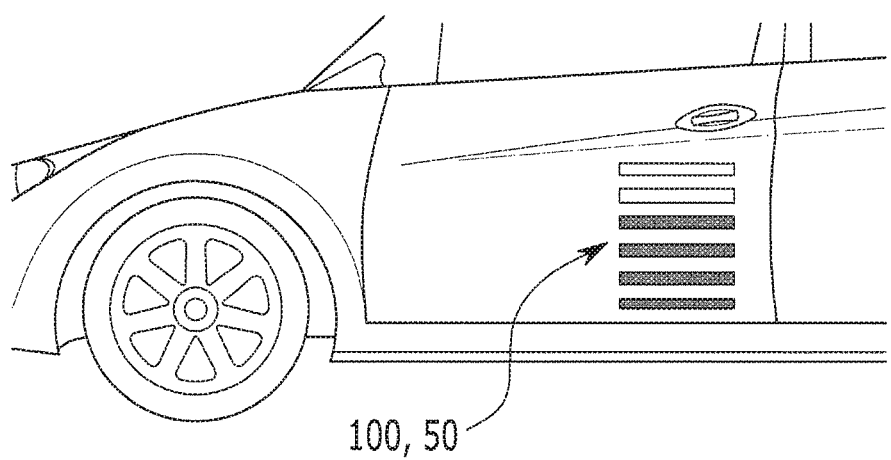

FIG. 7D shows a further embodiment of the composite sheet metal component 100 wherein the car door comprises the composite sheet metal component of FIGS. 2A-2C or 3A and 3B showing a battery charge level on the exterior of the car door.

Although the here aforementioned composite sheet metal component has been described in connection to vehicles or body parts, accordingly. For a person skilled in the art it is clearly and unambiguously understood that the here described composite sheet metal component can be applied to various object (e.g. airplane) which comprises composite sheet metal components or body panels, accordingly.

What is claimed is:

1. A composite sheet metal component for a vehicle, comprising:
    an inner metal sheet;
    an outer metal sheet; and
    an intermediate polymer sheet arranged between the inner and the outer metal sheet,
    wherein the intermediate polymer sheet comprises a semiconductor device, and
    wherein the outer metal sheet comprises at least one functional area,
    wherein the semiconductor device comprises a passive tag antenna and is charged by radio energy waves transmitted by a source.

2. A body panel for an automotive comprising the composite sheet metal component according to claim 1.

3. The composite sheet metal component according to claim 1, wherein the source is an electromagnetic source.

4. A composite sheet metal component for a vehicle, comprising:
    an inner metal sheet;
    an outer metal sheet; and
    an intermediate polymer sheet arranged between the inner and the outer metal sheet,
    wherein the intermediate polymer sheet comprises a semiconductor device, and
    wherein the outer metal sheet comprises at least one functional area,
    wherein the at least one functional area of the outer metal sheet is located above the semiconductor device which comprises a first electrode and a second electrode, and
    wherein the second electrode is fixed on semiconductor device and the at least one functional area is bendable toward the semiconductor device such that the first electrode is movable toward the second electrode.

5. The composite sheet metal component according to claim 4, wherein the semiconductor device is a microelectronic device.

6. The composite sheet metal component according to claim 4,
    wherein the intermediate polymer sheet comprises a thermoplastic material with a thickness of 0.15 millimeter to 0.35 millimeter.

7. The composite sheet metal component according to claim 6,
    wherein the thermoplastic material is Poly(methyl methacrylate) (PMMA).

8. The composite sheet metal component according to claim 4,
    wherein the inner metal layer comprises aluminum, steel, magnesium, or an alloy of the aluminum, steel, and magnesium, the inner metal layer having a thickness of 0.2 millimeter to 1.5 millimeter.

9. The composite sheet metal component according to claim 4,
    wherein the intermediate polymer layer is at least partially glued with the inner metal layer and the outer metal layer.

10. The composite sheet metal component according to claim 4,
    wherein the outer metal layer comprises aluminum, steel, magnesium, or an alloy of the aluminum, steel, and magnesium, the outer metal layer having a thickness of 0.2 millimeter to 1.5 millimeter.

11. A composite sheet metal component for a vehicle, comprising:
    an inner metal sheet;
    an outer metal sheet; and
    an intermediate polymer sheet arranged between the inner and the outer metal sheet,
    wherein the intermediate polymer sheet comprises a semiconductor device, and
    wherein the outer metal sheet comprises at least one functional area,
    wherein the at least one functional area of the outer metal sheet is configured to transmit light generated by the semiconductor device.

12. The composite sheet metal component according to claim 11,
    wherein the at least one functional area of the outer metal sheet comprises translucent areas.

13. The composite sheet metal component according to claim 11,
    wherein the intermediate polymer sheet comprises translucent materials which guide light of the semiconductor device toward the at least one functional area of the outer metal sheet.

14. The composite sheet metal component according to claim 13,
    wherein the translucent material comprises microstructure elements configured to couple out the light of the semiconductor device via the at least one functional area of the outer metal sheet.

15. The composite sheet metal component according to claim 11, wherein the semiconductor device is an optoelectronic device.

16. The composite sheet metal component according to claim 11,
wherein the at least one functional area of the outer metal sheet comprises non-translucent areas.

17. The composite sheet metal component according to claim 11,
wherein the intermediate polymer sheet comprises non-translucent materials which guide light of the semiconductor device toward the at least one functional area of the outer metal sheet.

18. A body panel for an automotive comprising the composite sheet metal component according to claim 11.

\* \* \* \* \*